W. E. SMITH.
ANTISEPTIC NEST EGG.
APPLICATION FILED SEPT. 19, 1910. RENEWED SEPT. 3, 1912.
1,042,494.
Patented Oct. 29, 1912.
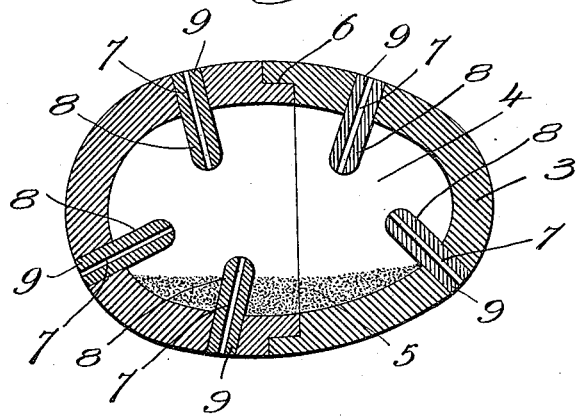
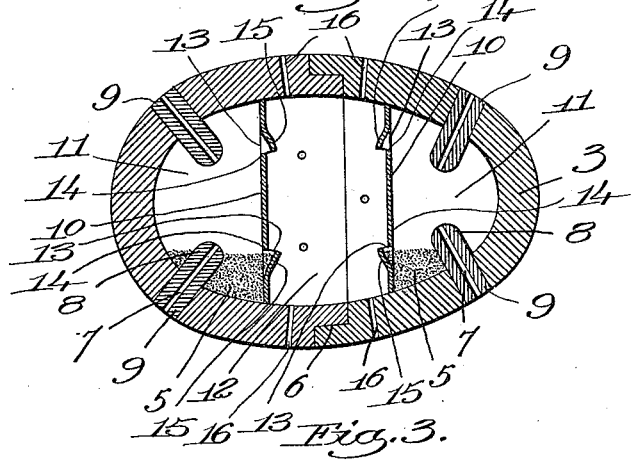
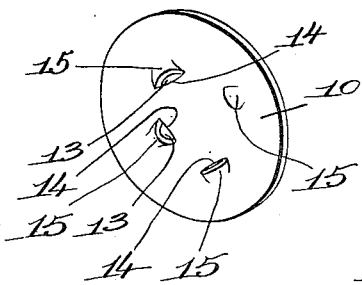

UNITED STATES PATENT OFFICE.

WALTER E. SMITH, OF BOSTON, MASSACHUSETTS, ASSIGNOR TO CHARLES C. ROGERS, OF WINCHESTER, MASSACHUSETTS.

ANTISEPTIC NEST-EGG.

1,042,494. Specification of Letters Patent. Patented Oct. 29, 1912.

Application filed September 19, 1910, Serial No. 582,588. Renewed September 3, 1912. Serial No. 718,396.

*To all whom it may concern:*

Be it known that I, WALTER E. SMITH, a citizen of the United States, residing at Boston, county of Suffolk, State of Massachusetts, have invented an Improvement in Antiseptic Nest-Eggs, of which the following description, in connection with the accompanying drawing, is a specification, like characters on the drawing representing like parts.

This invention relates to nest eggs of that type which are adapted to contain an insecticide or antiseptic preparation and which is provided with apertures through which such preparation or the odor thereof may escape.

The objects of the invention are to provide a novel nest egg which is so constructed that the insecticide therein will be agitated or stirred up by any rolling motion which the egg may have, and also to provide a novel construction whereby the antiseptic preparation is prevented from sifting out too freely through apertures in the egg.

I will first describe some embodiments of my invention and then point out the novel features thereof in the appended claims.

In the drawings, Figure 1 is a central sectional view of an egg embodying my invention; Fig. 2 is a similar view showing a different embodiment of the invention; Fig. 3 is a perspective view of one of the disks or partitions shown in Fig. 2.

Referring first to Fig. 1 the body or shell of the egg is shown at 3 and it may be of any suitable material. This shell or body is made with the interior chamber 4 which is adapted to receive an insecticide or antiseptic preparation 5 that is preferably in the form of a powder. The shell or body 3 may conveniently be made in two sections which are united together at the joint 6 by cement or in any other suitable way, although said body might be formed in any appropriate way without departing from the invention. The body 3 is provided with a plurality of apertures or perforations 7 through which the insecticide 5 and the odor thereof may escape. In order to prevent the insecticide from sifting too freely out through the apertures 7, I have provided the body 3 on its interior with the projections 8 through which the apertures 7 extend so that the inner end of each aperture is at the inner end of the projection. As one convenient way of making the egg I insert through the body 3 thereof a plurality of tubular members 9, the inner ends of which constitute the projections 8 and the bores through which constitute the apertures 7. These projections 8 also serve as a means for stirring up and agitating the insecticide 5 as the egg is rolled about the nest, and they are thus effective in preventing the insecticide from caking or hardening. This is a decided advantage, for in order to be effective, the insecticide should retain its dry powdery condition in order that whenever the egg is rolled or moved about the nest, the dust from the insecticide and the odor thereof may escape through the apertures 7.

In Fig. 2 I have shown another embodiment of my invention wherein means are also provided for stirring up the insecticide as the egg is rolled about the nest. In this embodiment the egg body, which is shown at 3, and which may conveniently be made in two sections, joined together at 6, as above described, is provided with two partitions 10, one in each section of the egg, which partitions divide the interior of the egg into two insecticide-receiving chambers 11 and a central distributing chamber 12. The body of the egg is provided with the tubular members 9, the ends 8 of which project into the insecticide-receiving chambers 11, each tubular member having the bore or passageway 7 through which the insecticide may escape. The disks or partitions 10 are provided with openings 13 through which the insecticide may gradually escape from the chambers 11 to the distributing chamber 12, and these openings can conveniently be made by slitting the partition 10 along the line 14, and then striking up the portion 15 adjacent the slit to form a cup or pocket. The body of the egg is provided with other apertures 16 leading to the exterior of the egg from the distributing chamber 12 and through which any insecticide which passes to the distributing chamber may escape.

Whenever an egg constructed as shown in Fig. 2 is rolled about the nest the insecticide powder 5 which is confined in the chambers 11 will be agitated and stirred up, partly by the projections 8 and partly by the cup-shaped portions of the partitions 10, and part of the powder will escape through the apertures 7 and some will be delivered into the distributing chamber 12, from which it will escape through the apertures 16. In this embodiment of my invention also the insecticide preparation is kept agitated by the turning movement of the egg so that the chambers within the egg will be more or less filled with clouds of dust or powder which are caused by the agitation of the insecticide preparation, and this dust will escape from the apertures in sufficient quantity to kill any lice or other vermin which may infest the nest or the hen.

I am aware that it has heretofore been proposed to make nest eggs with an interior chamber to hold insecticide and apertures through which the insecticide may escape, but my invention aims to provide means situated within the egg for preventing the insecticide from caking and for causing it to be stirred up more or less violently when the egg is rolled so as to develop a considerable quantity of dust.

Having fully described my invention, what I claim as new and desire to secure by Letters Patent is:—

1. In a nest egg, the combination with a body having an insecticide-receiving chamber, of insecticide in the form of a powder partially filling said chamber, and a plurality of open-ended tubular members extending radially through the walls of the body and into the chamber a sufficient distance so that those on the under side of the egg will pass through and terminate at their inner ends above the mass of insecticide whereby as the egg is rolled or moved the insecticide powder is stirred up and agitated by the tubular members thereby forming a dust which escapes through said members.

2. In a nest egg, the combination with a body having an interior chamber, of apertured partitions extending across the body and dividing its interior into insecticide-receiving and distributing chambers, and means within the insecticide-receiving chamber to cause the insecticide therein to be stirred up and agitated when the egg is rolled, said body having apertures leading to the distributing chamber.

In testimony whereof, I have signed my name to this specification, in the presence of two subscribing witnesses.

WALTER E. SMITH.

Witnesses:
 Louis C. Smith,
 Thomas J. Drummond.

Copies of this patent may be obtained for five cents each, by addressing the "Commissioner of Patents, Washington, D. C."